US008942217B2

(12) United States Patent
Kotha et al.

(10) Patent No.: US 8,942,217 B2
(45) Date of Patent: Jan. 27, 2015

(54) SYSTEM AND METHOD FOR HIERARCHICAL LINK AGGREGATION

(75) Inventors: Saikrishna Kotha, Austin, TX (US); Bruce Anthony Holmes, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 12/577,468

(22) Filed: Oct. 12, 2009

(65) Prior Publication Data

US 2011/0085570 A1     Apr. 14, 2011

(51) Int. Cl.
*H04W 4/00*    (2009.01)
*H04L 12/28*   (2006.01)
*H04L 12/741*  (2013.01)
*H04L 12/891*  (2013.01)
*H04L 12/743*  (2013.01)
*H04L 12/709*  (2013.01)

(52) U.S. Cl.
CPC ............. *H04L 45/745* (2013.01); *H04L 47/41* (2013.01); *H04L 45/7453* (2013.01); *H04L 45/54* (2013.01); *H04L 45/245* (2013.01)
USPC ........... 370/341; 370/219; 370/227; 370/397; 370/399; 370/395.32; 370/401; 370/408; 370/409; 370/437; 370/539; 370/541

(58) Field of Classification Search
None
See application file for complete search history.

(56) References Cited

U.S. PATENT DOCUMENTS

| | | | |
|---|---|---|---|
| 6,553,029 B1 | 4/2003 | Alexander | 370/389 |
| 2002/0114276 A1* | 8/2002 | Basturk | 370/230 |
| 2005/0198371 A1* | 9/2005 | Smith et al. | 709/238 |
| 2006/0209688 A1* | 9/2006 | Tsuge et al. | 370/229 |
| 2007/0098006 A1* | 5/2007 | Parry et al. | 370/437 |
| 2008/0037544 A1* | 2/2008 | Yano et al. | 370/392 |
| 2009/0003205 A1* | 1/2009 | Tomie et al. | 370/230 |
| 2009/0154337 A1 | 6/2009 | Kim et al. | 370/216 |
| 2009/0193105 A1* | 7/2009 | Charny et al. | 709/223 |
| 2009/0225752 A1* | 9/2009 | Mitsumori | 370/390 |
| 2010/0023726 A1* | 1/2010 | Aviles | 711/216 |
| 2010/0115174 A1* | 5/2010 | Akyol et al. | 710/316 |

* cited by examiner

*Primary Examiner* — Faruk Hamza
*Assistant Examiner* — Andrew Oh
(74) *Attorney, Agent, or Firm* — Baker Botts L.L.P.

(57) ABSTRACT

Systems and methods for hierarchical link aggregation are disclosed. A system for hierarchical link aggregation may include a network interface having a plurality of physical ports. A first plurality of the physical ports may be configured as member ports of a first link aggregation group (LAG). A second plurality of the physical ports may be configured as member ports of a second LAG. The first LAG and second LAG may be configured as member logical ports of a third LAG.

11 Claims, 4 Drawing Sheets

SYSTEM AND METHOD FOR HIERARCHICAL LINK AGGREGATION

TECHNICAL FIELD

The present disclosure relates in general to networking and communication, and more particularly to hierarchical link aggregation in a network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often disposed in networking systems which communicatively couple numerous information handling systems together, sometimes over vast distances. To facilitate communication, information handling systems often include network interface cards or similar hardware. Such network interface cards may include communication ports through which data may be transmitted to or received from other networked information handling systems. Such ports may be coupled by cables, fibers, and/or other media.

Many network architectures employ link aggregation. Link aggregation (e.g., IEEE 802.1AX-2008) may generally describe the practice of using multiple network cables and/or ports in parallel to increase the link speed beyond the limits of any one single cable or port, and to increase redundancy for higher availability. In link aggregation, a group or set of ports may be combined and represented as a single logical port to other components of the network system. Various switching elements of the network system may "see" the aggregated ports (known as a "link aggregation group" or "LAG") as a single logical communication port in the routing tables or databases of networking components external to the LAG. Network traffic may be distributed through the various member ports of a LAG in accordance with a hashing algorithm.

Due to hardware complexity incumbent in determining which member port of a LAG is to distribute a particular portion of network traffic, traditional link aggregation approaches are often limited in the number of member ports that may make up a LAG. Accordingly, the total aggregate bandwidth of traditional LAGs is also limited.

In addition, many traditional approaches to link aggregation require that member ports be identical or similar (e.g., requirement that all ports be of the same speed), in order to keep hashing algorithms simple. Such requirements limit network architecture flexibility.

SUMMARY

In accordance with the teachings of the present disclosure, the disadvantages and problems associated with traditional approaches to link aggregation have been substantially reduced or eliminated.

In accordance with one embodiment of the present disclosure, a system for hierarchical link aggregation may include a network interface having a plurality of physical ports. A first plurality of the physical ports may be configured as member ports of a first link aggregation group (LAG). A second plurality of the physical ports may be configured as member ports of a second LAG. The first LAG and second LAG may be configured as member logical ports of a third LAG.

In accordance with another embodiment of the present disclosure, an information handling system may include a processor and a network interface communicatively coupled to the processor, the network interface having a plurality of physical ports. A first plurality of the physical ports may be configured as member ports of a first link aggregation group (LAG). A second plurality of the physical ports may be configured as member ports of a second LAG. The first LAG and second LAG may be configured as member logical ports of a third LAG.

In accordance with a further embodiment of the present disclosure, a method for hierarchical link aggregation is provided. The method may include receiving a packet of information at an information handling system. The method may further include determining that a first link aggregation group (LAG) is a first outgoing logical port of the packet based on a destination address of the packet. The method may also include determining that a second LAG is a second outgoing logical port of the packet based on information contained in the packet, wherein the second LAG is configured as a member logical port of the first LAG. The method may additionally include determining that a physical port is a third outgoing logical port of the packet based on information contained in the packet, wherein the physical port is configured as a member port of the second LAG. Moreover, the method may include transmitting the packet to the physical port.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
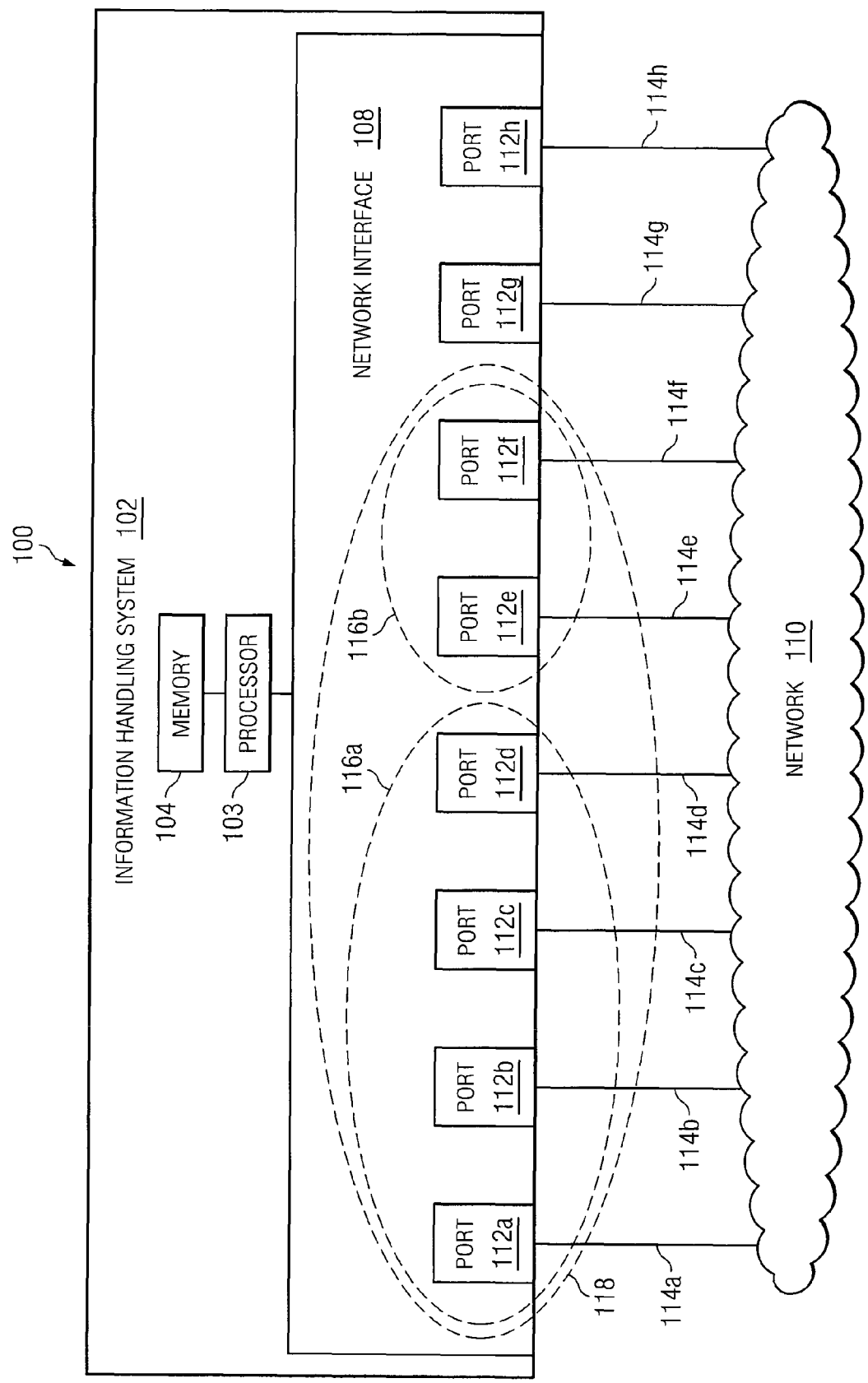
FIG. 1 illustrates a block diagram of an example system including a networked information handling system configured to communicate via hierarchical link aggregation groups, in accordance with certain embodiments of the present disclosure.

FIG. 1 illustrates a block diagram of an example system 100 including a networked information handling system 102 configured to communicate via hierarchical link aggregation groups 116 and 118, in accordance with certain embodiments of the present disclosure. As depicted, system 100 may include one or more information handling systems 102 (referred to generally herein as information handling system 102 or information handling systems 102) and a network 110. Information handling system 102 may be coupled to network 110 via transmission media 114. Information handling system 102 may generally be configured to receive data from and/or transmit data to one or more other information handling systems 102 via network 110. Information handling system 102 may in certain embodiments, comprise a server. In the same or alternative embodiments, information handling system 102 may comprise a storage resource and/or other computer-readable media (e.g., a storage enclosure, hard-disk drive, tape drive, etc.) operable to store data. In the same or other alternative embodiments, information handling system 102 may comprise a switch. In yet other embodiments, one or more information handling systems 102 may comprise a peripheral device, such as a printer, sound card, speakers, monitor, keyboard, pointing device, microphone, scanner, and/or "dummy" terminal, for example. In addition, although system 100 is depicted as having a single information handling system 102, it is understood that system 100 may include any number of information handling systems 102.

As depicted in FIG. 1, information handling system 102 may include a processor 103, a memory 104 communicatively coupled to processor 103, and a network interface 108 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage media 106 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Network interface 108 may include any suitable system, apparatus, or device operable to serve as an interface between information handling system 102 and network 110.

Network interface 108 may enable information handling system 102 to communicate over network 110 using any suitable transmission protocol and/or standard, including without limitation all transmission protocols and/or standards enumerated below with respect to the discussion of network 110. Network interface 108 and its various components may be implemented using hardware, software, or any combination thereof.

As depicted in FIG. 1, network interface 108 may include one or more physical ports 112. Each physical port 112 may include any system, device or apparatus configured to serve as a physical interface between a corresponding transmission medium 114 and network interface 108. In some embodiments, each physical port 112 may comprise an Ethernet port.

Network 110 may be a network and/or fabric configured to communicatively couple information handling system 102 to one or more information handling systems and/or other devices. In certain embodiments, network 110 may include a communication infrastructure, which provides physical connections, and a management layer, which organizes the physical connections of information handling system 102 and other devices coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Each transmission medium 114 may include any system, device, or apparatus configured to couple a corresponding port 112 to network 110 and communicate information between the corresponding port 112 to network 110. For example, a transmission medium 114 may include an Ethernet cable, a T1 cable, a WiFi signal, a Bluetooth signal, or other suitable medium.

As shown in FIG. 1, two or more physical ports 112 may be grouped into a first-level link aggregation group (LAG) 116. For example, first-level LAG 116a may include member physical ports 112a, 112b, 112c, and 112d, and first-level LAG 116b may include member physical ports 112e and 112f. Although first-level LAGs 116 are depicted as including a particular number of member physical ports 112, each first-level LAG 116 may include any suitable number of member physical ports 112.

Also as shown in FIG. 1, two or more first-level LAGs 116 may be grouped into a second-level LAG 118. For example, second-level LAG 118 may include member first-level LAGs 116a and 116b. Although second-level LAG 118 is depicted as including a particular number of member first-level LAGs 116, each second-level LAG 118 may include any suitable number of member first-level LAGs 116. In addition, although system 100 is depicted as including one second-level LAG 118, system 100 may include any suitable number of second-level LAGs 118. Moreover, although only two levels of hierarchical LAGs are depicted in FIG. 1 for the purposes of clarity and exposition, system 100 may have any suitable number of levels of hierarchical LAGs. For example, system 100 may include any suitable number of third-level LAGS having two or more second-level LAGs 118, may include any suitable number of fourth-level LAGs have two or more third-level LAGs, and so on.

Each LAG of system 100 (regardless of whether a first-level LAG 116, second-level LAG 118, or other-level LAG) may combine its member ports or member LAGs using link aggregation such that the member ports or member LAGS are represented as a single logical port to components of system 100 external to the LAG. For example, in the embodiment shown in FIG. 1, first-level LAGs 116 may each appear as a single logical port to second-level LAG 118, and second-level LAG 118 may appear as a single logical port to processor 103, network interface 108 or other component of system 100.

As is described in greater detail below, when a message is communicated to a particular second-level LAG 118, a hashing algorithm or other suitable method may be used to determine the member first-level LAG 116 to which the message is communicated. In addition, when a message is communicated to a particular first-level LAG 116, a hashing algorithm (which may be different, identical, or similar hashing algorithm than that used at second-level LAG 118) may be used to determine the member physical port 112 to which the message is communicated.

The hashing algorithm used by a LAG of a particular level may be different, identical, or similar to the hashing algorithm used at another level. For example, the hashing algorithm used by a first-level LAG 116 may be different, identical, or similar to the hashing algorithm used at second-level LAG 118 (or any other-level LAG). In addition, the hashing algorithm used by a particular LAG of a particular level may be different, identical, or similar to the hashing algorithm used by a different LAG at the same level in a hierarchy. For example, the hashing algorithm used by first-level LAG 116a may be different, identical, or similar hashing algorithm than that used at first-level LAG 116b.

Figure 2:
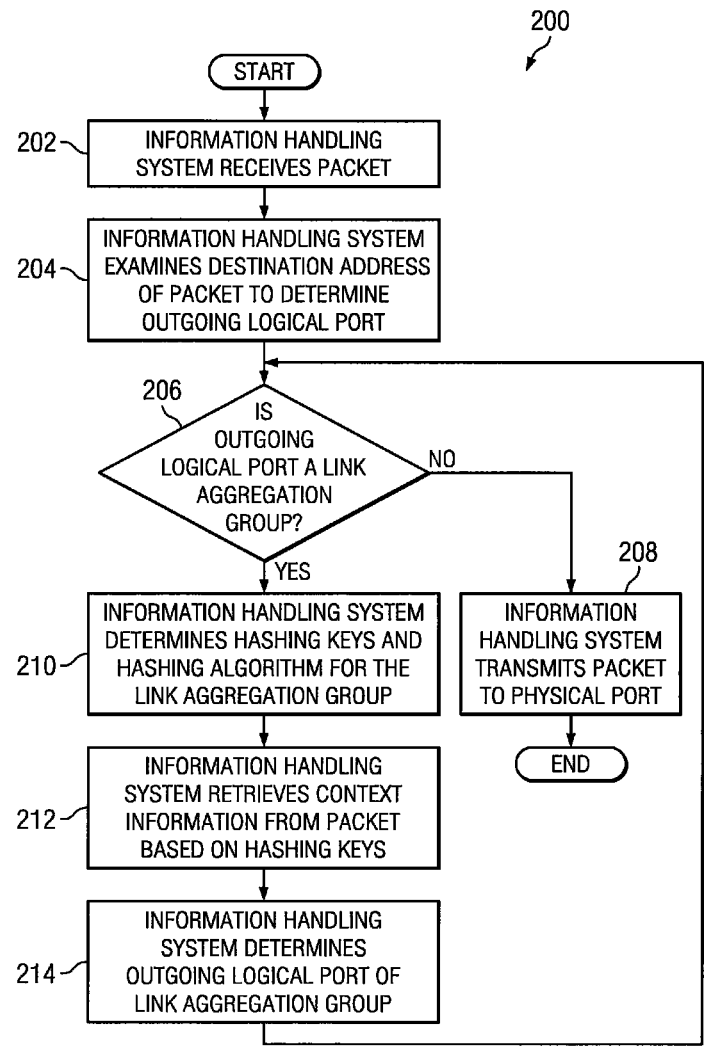
FIG. 2 illustrates a flow chart of an example method for implementing hierarchical link aggregation groups, in accordance with certain embodiments of the present disclosure.

FIG. 2 illustrates a flow chart of an example method 200 for implementing hierarchical link aggregation groups, in accordance with certain embodiments of the present disclosure. According to one embodiment, method 200 may begin at step 202. As noted above, teachings of the present disclosure may be implemented in a variety of configurations of system 100. As such, the initialization point for method 200 and the order of the steps 202-214 comprising method 200 may depend on the implementation chosen.

At step 202, an information handling system (e.g., information handling system 102) may receive a packet.

At step 204, the information handling system may examine the destination address of the packet to determine the outgoing logical port for the packet. The outgoing logical port may be a LAG (e.g., first-level LAG 116 or second-level LAG 118) or a physical port (e.g., physical port 112).

At step 206, the information handling system may determine if the outgoing logical port for the packet is a LAG. If it is determined that the outgoing logical port is a LAG, method 200 may proceed to step 210. Otherwise, if it is determined that the outgoing logical port is not a LAG (and thus is a physical port, such as a physical port 112, for example), method 200 may proceed to step 208.

At step 208, in response to a determination that the outgoing logical port is not a LAG, information handling system may transmit to the physical port indicated by the determined output logical port. After completion of step 208, method 200 may end.

At step 210, in response to a determination that the outgoing logical port is a LAG, the information handling system may determine hashing keys and a hashing algorithm for the LAG. In some embodiments, the hashing keys and/or hashing algorithm may be predetermined and/or preset.

At step 212, the information handling system may retrieve context information from the packet based on the hashing keys.

At step 214, based on the hashing algorithm and context information, the information handling system may determine the outgoing logical port within the link aggregation group. After completion of step 214, method 200 may proceed again to step 206, wherein steps 206, 210, 212, and 214 may repeat for each level of the LAG hierarchy of the information handling system.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3:
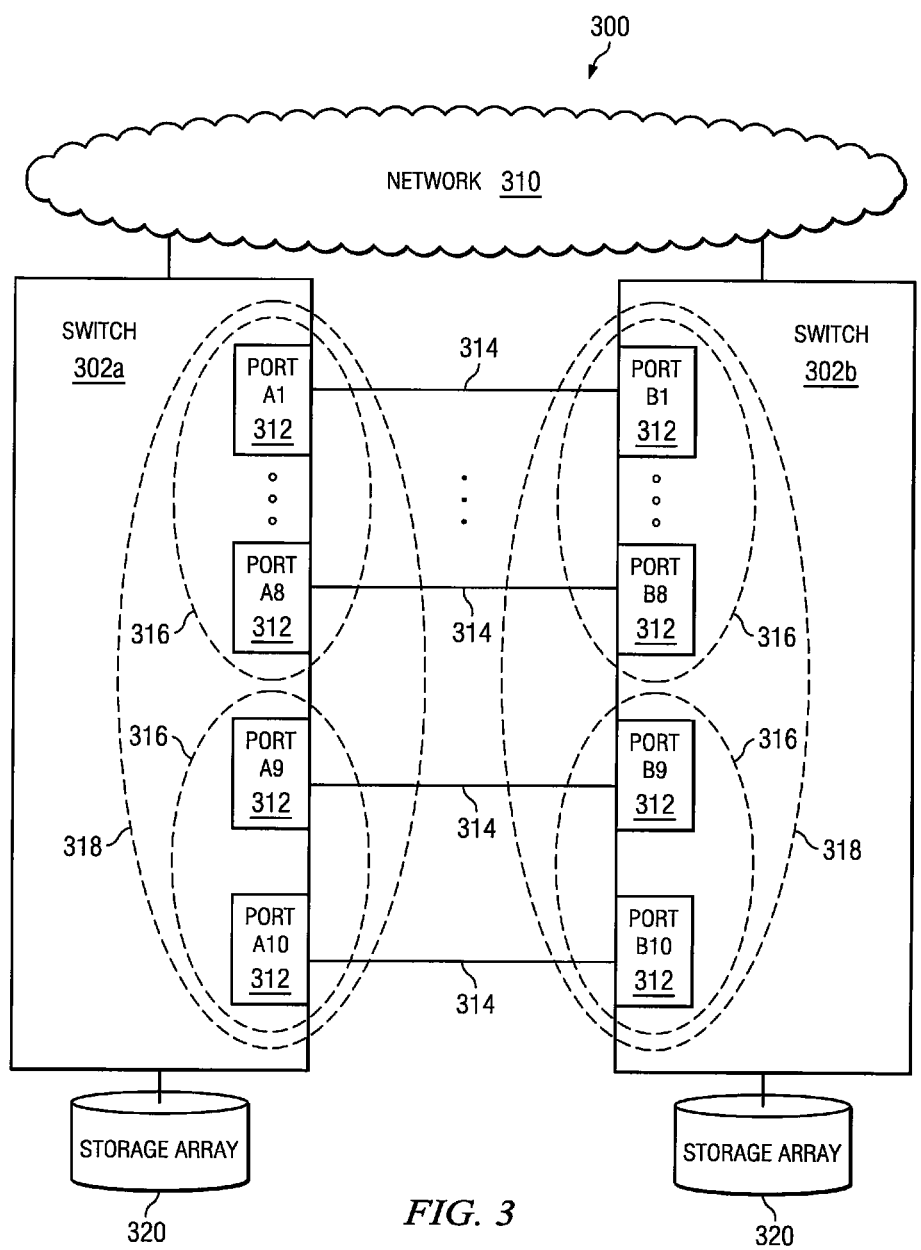
FIG. 3 illustrates a block diagram of an example storage area network depicting an application of hierarchical link aggregation groups, in accordance with certain embodiments of the present disclosure.

FIG. 3 illustrates a block diagram of an example storage area network 300 depicting an application of hierarchical link aggregation groups (e.g., first-level LAGs 316 and second-level LAGs 318), in accordance with certain embodiments of the present disclosure. As depicted in FIG. 3, storage area network 300 may include a network 310, one or more switches 302 coupled to network 310, and one or more storage arrays 320 coupled to switches 302.

Each switch 302 may generally be configured to communicatively couple storage arrays 320 to network 310, and may further be operable to inspect packets as they are received, determine the source and destination of each packet (e.g., by reference to a routing table), and forward each packet appropriately. One or more of switches 302 may include a plurality of physical ports 312 which may be identical to similar to ports 112 of FIG. 1.

Network 310 may be configured to couple switches 302 to one or more information handling systems. Network 310 may be identical or similar to network 110 of FIG. 1. Each storage array 320 may include one or more computer-readable media for storing data.

To improve bandwidth and/or availability of communications between each of switch 302, each of switch 302 may be configured such that it uses hierarchical LAGs similar to that depicted in FIG. 1. For example, each switch 302 may include two or more first-level LAGs 316 each having a plurality of ports 312, and one or more second-level LAGs 318 wherein each second-level LAG includes two or more first-level LAGs 316.

Figure 4:
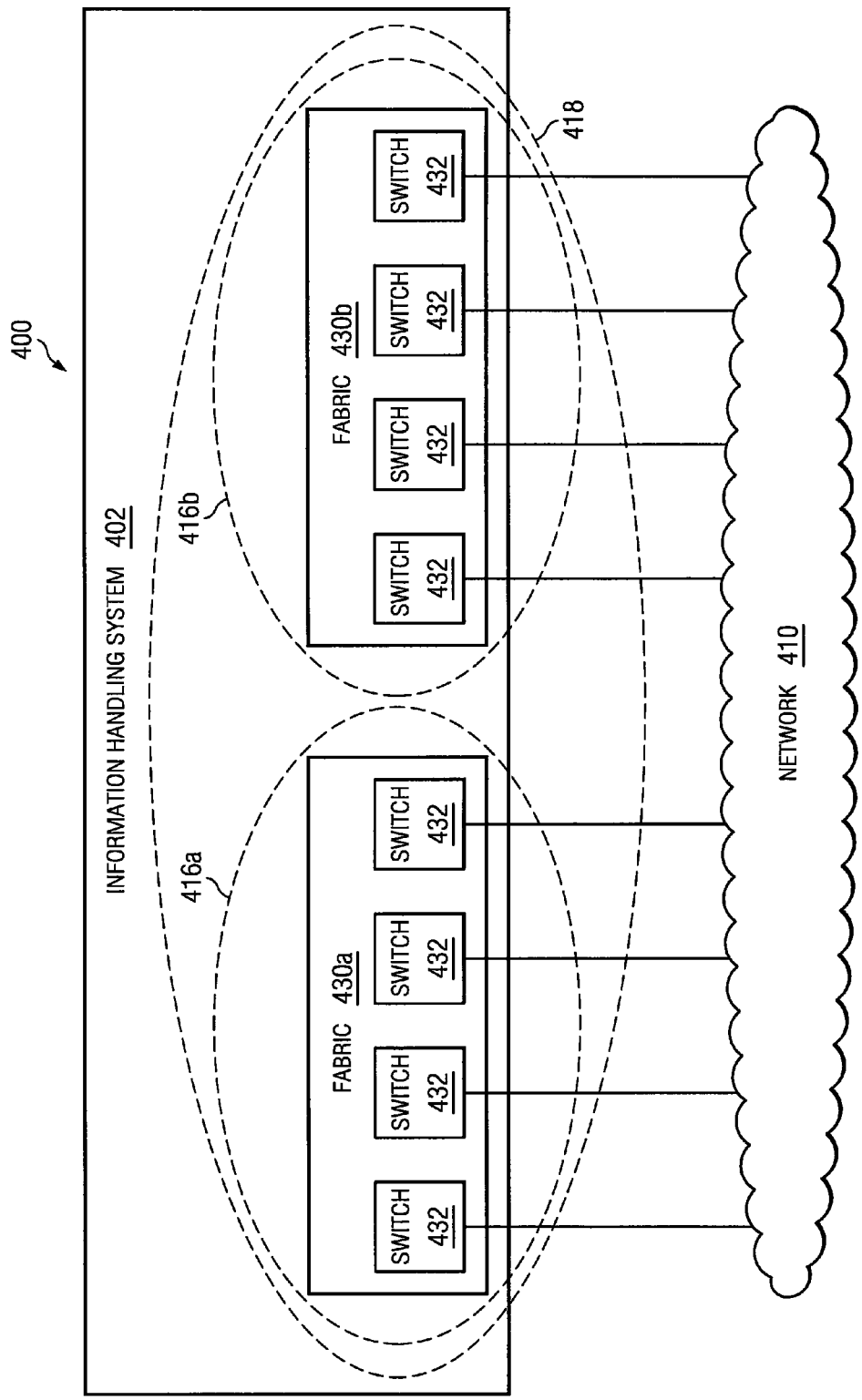
FIG. 4 illustrates a block diagram of a system depicting another application of hierarchical link aggregation groups, in accordance with certain embodiments of the present disclosure.

FIG. 4 illustrates a block diagram of a system 400 depicting another application of hierarchical link aggregation groups (e.g., first-level LAGs 416 and second-level LAGs 418), in accordance with certain embodiments of the present disclosure. Network 410 may be different, similar, or identical to network 110 of FIG. 1. As depicted in FIG. 4, system 400 may include an information handling system 402 coupled to a network 410. In particular embodiments, information handling system 402 may be contained within an enclosure or chassis.

As shown in FIG. 4, information handling system 402 may include one or more fabrics 430. Each fabric 430 may include a plurality of switches 432. Switches 432 may be different, similar, or identical to switches 302 of FIG. 3.

To improve bandwidth and/or availability of communications between information handling system 402 and network 410, fabrics 430 may be configured such that they use hierarchical LAGs similar to that depicted in FIG. 1. For example, each fabric 430 may be configured such that its switches 432 are members of a first-level LAG 416, and each first-level LAG 416 may be configured to be a member of a second-level LAG 418, wherein second-level LAG 418 includes a plurality of first-level LAGs 416.

In traditional systems (e.g., with hierarchical LAGS), the two fabrics 430 would be treated as two separate network interfaces and may require special hardware or software to block one of the interfaces in order to avoid potential network loops. However, by using a system similar to that of system 400, such disadvantages may be reduced or eliminated. To illustrate, because second-level LAG 418 is represented as one logical port, no looping issue exists. One of the first-level LAGs (e.g. LAG 416b comprising fabric 430b) may have its aggregate bandwidth advertised as zero, such that another first-level LAG (e.g., LAG 416a comprising fabric 430a), may carry traffic between information handling system 402 and network 410. In the case of a failure of fabric 430a (or its capacity dropping below a threshold bandwidth), the aggregate bandwidth of first-level LAG 416b may be re-advertised as non-zero, and traffic may be distributed between information handling system 402 and network 410 via first-level LAG 416b, thus providing redundancy and availability without suffering the disadvantages of existing approaches.

Although the present disclosure has been described in detail, it should be understood that various changes, substitutions, and alterations can be made hereto without departing from the spirit and the scope of the disclosure as defined by the appended claims.

What is claimed is:

1. A system for hierarchical link aggregation, comprising a network interface device communicatively coupled to a processor, the network interface device having a plurality of physical ports comprising:
   a first plurality of the physical ports designated by the processor as member ports of a first link aggregation group (LAG), a first port of the first plurality of physical ports having a first transmission capacity and a second port of the first plurality of physical ports having a second transmission capacity; and
   a second plurality of the physical ports designated by the processor as member ports of a second LAG;
   wherein the first LAG and the second LAG are designated by the processor as member logical ports of a third LAG;
   wherein data communicated to the third LAG is distributed between the first LAG and the second LAG in accordance with a first hashing algorithm;
   wherein data communicated to the third LAG and distributed to the first LAG is distributed among the first plurality of ports in accordance with a second hashing algorithm; and
   wherein data communicated to the third LAG and distributed to the second LAG is distributed among the second plurality of ports in accordance with a third hashing algorithm, wherein the first hashing algorithm is different from the second hashing algorithm and the first hashing algorithm is different from the third hashing algorithm.

2. The system of claim 1, wherein:
   the first LAG is configured such that the first LAG is represented to components of the system external to the first LAG as a single logical port; and
   the second LAG is configured such that the second LAG is represented to components of the system external to the second LAG as a single logical port.

3. The system of claim 1, wherein the third LAG is configured such that the third LAG is represented to components of the system external to the third LAG as a single logical port.

4. The system of claim 1, wherein the second hashing algorithm and the third hashing algorithm are identical.

5. The system of claim 1, wherein the second hashing algorithm and the third hashing algorithm are different.

6. An information handling system comprising:
   a processor;
   a network interface device communicatively coupled to the processor, the network interface device having a plurality of physical ports, wherein:
      a first plurality of the physical ports are designated by the processor as member ports of a first link aggregation group (LAG), a first port of the first plurality of physical ports having a first transmission capacity and a second port of the first plurality of physical ports having a second transmission capacity;
      a second plurality of the physical ports are designated by the processor as member ports of a second LAG; and
      the first LAG and second LAG are designated by the processor as member logical ports of a third LAG; and
   a memory communicatively coupled to the processor and having stored thereon computer-executable instructions that, when executed by the processor are configured to:
      distribute data communicated to the third LAG between the first LAG and the second LAG in accordance with a first hashing algorithm;
      distribute data communicated to the third LAG and distributed to the first LAG among the first plurality of ports in accordance with a second hashing algorithm, the second hashing algorithm different from the first hashing algorithm; and distribute data communicated to the third LAG and distributed to the second LAG among the second plurality of ports in accordance with a third hashing algorithm, the third hashing algorithm different from the first hashing algorithm.

7. The information handling system of claim 6, wherein:

the first LAG is configured such that the first LAG is represented to components of the information handling system external to the first LAG as a single logical port; and the second LAG is configured such that the second LAG is represented to components of the information handling system external to the second LAG as a single logical port.

8. The information handling system of claim 6, wherein the third LAG is configured such that the third LAG is represented to components of the information handling system external to the third LAG as a single logical port.

9. The information handling system of claim 6, wherein the second hashing algorithm and the third hashing algorithm are identical.

10. The information handling system of claim 6, wherein the second hashing algorithm and the third hashing algorithm are different.

11. A method for hierarchical link aggregation, comprising:

receiving a packet of information at an information handling system;

determining that a third link aggregation group (LAG) is a first outgoing logical port of the packet based on a destination address of the packet;

determining that a first LAG or a second LAG is a second outgoing logical port of the packet based on information contained in the packet, wherein the first LAG and the second LAG are member logical ports of the third LAG and the first LAG includes a first plurality of the physical ports designated by the processor as member ports of the first LAG;

determining that a physical port is a third outgoing logical port of the packet based on information contained in the packet, wherein the physical port is a member port of the first LAG or the second LAG;

transmitting the packet to the physical port;

wherein a first port of the first plurality of physical ports of the first LAG has a first transmission capacity and a second port of the first plurality of physical ports has a second transmission capacity;

wherein determining that the first LAG or the second LAG is the second outgoing logical port of the packet includes applying a first hashing algorithm that selects a logical port of the first LAG based on information contained in the packet; and wherein determining that the physical port is the third outgoing logical port of the packet includes applying a second hashing algorithm that selects a logical port of the first LAG or the second LAG based on information contained in the packet, wherein the first hashing algorithm is different from-the second hashing algorithm.

* * * * *